United States Patent
Ulich

[15] 3,669,477
[45] June 13, 1972

[54] HUB AND SHAFT SECUREMENT MEANS

[72] Inventor: Michael D. Ulich, South Wellfleet, Mass.
[73] Assignee: Westinghouse Electric Corporation, Pittsburgh, Pa.
[22] Filed: Aug. 21, 1970
[21] Appl. No.: 65,985

[52] U.S. Cl. ............................ 287/52.07, 287/53 H, 74/548
[51] Int. Cl. ............................................................. F16d 1/06
[58] Field of Search .................... 287/53 H, 52.07; 306/28; 279/99; 74/548, 553; 292/353, 354

[56] References Cited

UNITED STATES PATENTS

| | | | |
|---|---|---|---|
| 3,468,568 | 9/1969 | Ulich | 287/53 H |
| 2,718,417 | 9/1955 | Hansen | 287/53 H |
| 2,945,712 | 7/1960 | Lewis | 287/53 H |
| 3,164,402 | 1/1965 | Jobe | 151/8 |
| 2,774,852 | 12/1956 | Boardman | 287/53 H |

*Primary Examiner*—Andrew V. Kundrat
*Attorney*—F. H. Henson, E. C. Arenz and R. B. Farley

[57] ABSTRACT

A hub and shaft securement arrangement is provided in which a spring clip having a loop portion and a tongue portion is arranged with an extension thereof between the loop and tongue portions disposed within a hub so as to be squeeze between flattened portions on it and an inserted shaft and with the tongue end in compressing relationship relative to the hub and the loop portion compressingly engaged between the other termination of the hub and a shoulder formed by a cross groove in the shaft. This clip arrangement, then, provides a securement means which may mount a fan hub on either end of a double shafted motor, and yet still may secure the hub to the shaft. It also provides a securement means which eliminates close tolerance requirements between various faces and shoulders on the hub and shaft.

3 Claims, 3 Drawing Figures

WITNESSES
Theodore F. Wrobel
James F. Young

INVENTOR
Michael D. Ulich
BY Richard B. Farley
ATTORNEY 3,669,477

HUB AND SHAFT SECUREMENT MEANS

BACKGROUND OF THE INVENTION

1. Field of the Invention

This invention relates to a securement means disposed between a hub and shaft and, more particularly, relates to a spring clip securement means utilized to hold a hub, such as a fan hub, to a rotatable shaft.

2. Description of the Prior Art

Integral plastic molded hub and fan combinations have been found advantageous from a cost standpoint and have found wide acceptance in industry. A part of their major use has been in air conditioning systems such as room air conditioners which require a fan for providing a relatively small volume of air.

The provision of clip like fastening means to fasten a fan hub to a shaft has been heretofore suggested for fans having integral plastic hubs, such being shown, for example, in U.S. Pat. Nos. 3,468,568 and 3,264,016. Clip like means have also been utilized for fastening metal hubs to shafts as shown for example in U.S. Pat. No. 2,945,712. However, none of the hub and shaft coupling means shown in the above-mentioned patents provide for the use of a hub and shaft where the connecting point tolerances thereof do not have to be closely maintained or provide a clip arrangement which may be utilized with the fan hub switched end for end so as to accommodate a fan whether it is disposed for turning in a clockwise or counterclockwise direction to provide a flow of air.

Accordingly, it would be very advantageous to provide a hub and shaft coupling arrangement wherein a clip member was utilized which eliminated the necessity for close tolerances between the hub and shaft and one that afforded greater flexibility based on the fact that it could be utilized to fixedly maintain a fan and hub arrangement on a shaft independent of the left or right hand mounting of the hub member.

SUMMARY OF THE INVENTION

In accordance with the principles of the invention, both a shaft and a hub are provided with flattened areas contiguous to each other to provide both a location for insertion and a positioning and tensioning arrangement for the clip member. The shaft has a cross groove outwardly of the hub immediately adjacent its flattened portion to provide a nesting position for a loop portion of the clip member. The clip member includes an elongated flattened portion which is inserted between the flattened portions of the hub and shaft so that one end of the clip, terminating in a tongue portion, resiliently grasps a portion of the hub and the other end of the clip, terminating the loop portion, resiliently grasps a portion of the hub and nestingly fits in said cross groove.

In assembly, the clip member may be secured to the hub in its flattened area with the extending tongue and the inner segment of the loop portion in a compressing and engaging relationship with the outer terminations of the hub. The hub may then be disposed over the shaft and the extended portion of the clip, because of pressing engagement between the hub and shaft, forces the extreme end of the loop axially outwardly to be received resiliently in the cross groove and in abutting relationship with the shoulder formed thereby. A bent out tab formed on the loop portion provides an easily accessible finger to accept a screwdriver or other wedge means to lift the loop portion out of the cross groove of the shaft to permit disassembly of the shaft and hub.

DRAWING DESCRIPTION

For a better understanding of the invention, reference may be had to the preferred embodiment, exemplary of the invention, shown in the accompanying drawings in which.

DESCRIPTION OF THE PREFERRED EMBODIMENT

Figure 2:
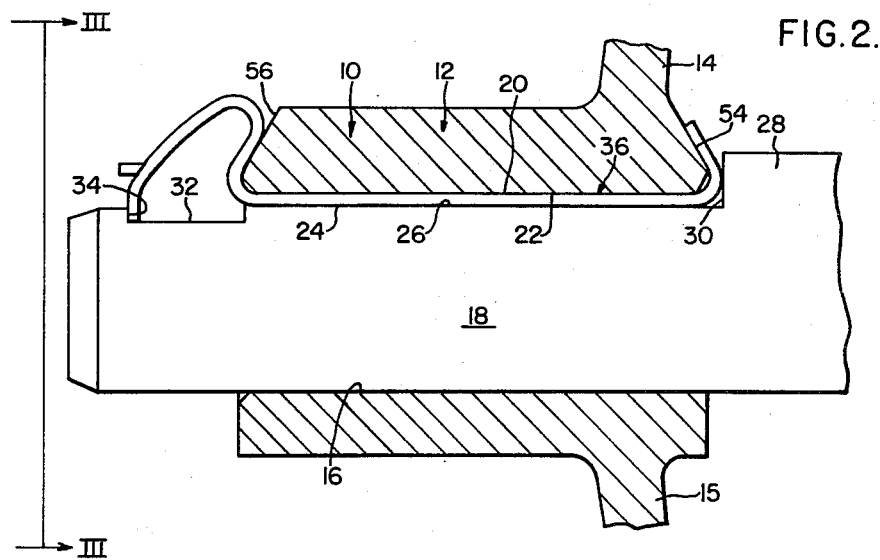
FIG. 2 is a partial cross section view of the assembled hub, clip and shaft in elevation.
Figure 3:
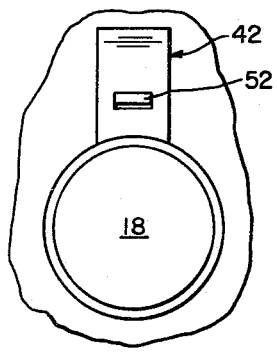
FIG. 3 is a view taken on line III—III of FIG. 2.

A plastic fan and integral hub 10 which is utilized in carrying out the invention is illustrated partially in FIGS. 2 and 3, with the fan 15, itself, being either of the propeller or blower wheel type and including a hub 12 which is integrally connected to blades 14 (shown only fragmentary) of the fan 15. A bore 16 is provided in the hub 12 so as to mount the fan on a shaft 18. The bore 16 of the hub 12 of the fan also includes a flattened wall portion 20 so as to provide at least one flat surface 22, with this flat surface extending linearly parallel to the axis of the hub 12 from its front to back.

Shaft 18 also includes a corresponding flat side 24 so as to provide a flat surface 26 which is contiguous to, substantially coextensive with, and in confronting relationship with the flat surface 22 of hub 14. At the rightward end of shaft 18, flat surface 26 is terminated by the termination of flat side 24 so as to form a shoulder 28 having a flat face 30 which is generally perpendicular to the axis of the shaft 18. Leftwardly, the flat surface 26 is terminated by a cross groove 32 which extends radially inwardly inwardly from flat surface 26 relative to the shaft 18 and also transversely thereof for the width of the flat surface 26. The most leftward extent of the cross groove 32 provides a flat face 34 that extends substantially perpendicular to the axis of the shaft 18, the purpose of which will be described in greater detail later.

Figure 1:
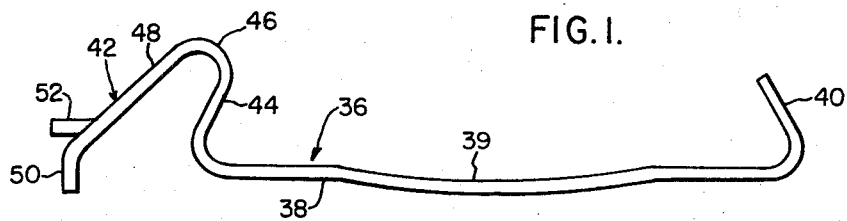
FIG. 1 is a view in elevation of the clip member in an unstressed state.

A spring clip member 36, shown in its uncompressed state in FIG. 1, is disposed between the hub 12 and shaft 18 to provide a means for maintaining these two elements in assembled relationship. The spring clip 36 includes an elongated portion 38 which terminates at one end in a tongue portion 40 and terminates at its other end in a loop portion 42. Tongue portion 40 extends at somewhat of an acute angle to the elongated portion 38, while loop portion 42 takes the general shape of a half loop in elevation. It includes a first portion 44 which is acutely angled relative to elongated portion 38, so that a geometric extension of it and a geometric extension of tongue portion 40 would converge and intersect. A second portion 46 is joined to portion 44 and is bent back on the portion 44 so as to provide a bend of slightly less than 180°. A third portion 48 is integrally attached to the second portion and also extends generally at an acute angle relative to the elongated portion 38 but is disposed at a slightly more acute angle thereto than the portion 44. The portions 44, 46 and 48 thereby form the half loop configuration of spring clip 36.

Spring clip member 36 is completed by a tip portion 50, which, in the compressed condition (FIG. 2), assumes a substantially perpendicular relationship relative to elongated portion 38 but in the free state attains a position which is rotated slightly clockwise therefrom so that the spring clip member 36, as a whole, is slightly compressed upon assembly with the hub 12 and the shaft 18. An outwardly extending tang 52 is struck from the third portion 48 to provide a fingerlike means which may be engaged by a screw-driver or the like to remove the loop portion from cross groove 32 to disassemble the hub 12 and shaft 18.

The spring clip member 36 is first assembled to the hub member 12 and then this subassembly assembled with the shaft 18. To aid in the assembly of the hub with the spring clip 36, the hub 12 is provided with two angularly extending faces 54 and 56 which receive the portions 40 and 44 of the clip member 36 in confronting relationship, with these two portions of the clip member 36, along with the elongated portion 38, compressingly encompassing the hub 12 along their extents.

The hub 12 and spring clip member 36 are then assembled to the shaft 18, by the hub and spring clip member being slid over the end of the shaft 18 until the first portion 40 of spring clip means 36 abuts against the face 30 formed by the shoulder 28 of shaft 18. Because of the relative distance between flat wall portion 20 and the flat side 24 on the hub and the shaft, the elongated portion 38 of clip member 36 which includes an inwardly bowed portion 39 is squeezed therebetween which forces the loop portion 42 of the spring clip member slightly axially outwardly and downwardly towards the cross groove 32. The tip portion 50 of the spring clip member 36 need then only be turned counterclockwise so that the loop portion 42 is disposed substantially entirely within the cross groove 32 with the tip portion 50 in abutting relationship with the face 34 of cross groove 32. In this assembled position, then, the tip portion of the spring clip member 36 is abuttingly and compressingly held against the face 34 formed by the cross groove 32 because it is preloaded to move in this direction not only by the axially outward and downwardly movement imparted by compressed portion 38 but also because, primarily, the end of the tip portion 50 is offset inwardly from elongated portion 38 of clip 36, while the tongue portion 40 is compressingly held against the flat face 30 by it. At the same time, the tongue portion 40 and first portion 44 compressingly engage the hub so that the hub 12 of the fan is fixedly held to the shaft 18 for rotation thereof, as desired.

It should be clear to one skilled in the art that the advantages attendant to the described invention include all those enumerated in the first portion of the description and, since a resilient clip member is utilized between the faces on the shaft and hub, that close tolerances between these faces need not be maintained since the inherent resiliency of the clip member will accommodate a substantially wide range of tolerances between these locations. Additionally, the axial length of the hub of the fan is not critical since, again, the inherent resiliency of the spring clip may be utilized to accommodate wide variations in the length tolerances between their locations. Further, the fan and integral hub may be mounted on either shaft (leftwardly or rightwardly) of a double shaft motor and still provide an effective fastening member between it and its shaft.

Thus, a spring clip, shaft and hub configuration has been described which may be easily fabricated and assembled at a low cost and also one, which will be apparent to one skilled in the art, that can be modified without departing from the spirit of the invention since the specific embodiment disclosed is only exemplary. For example, the hub and fan could be made as separate connectable assemblies or they could be fabricated from some material other than plastic.

I claim as my invention:

1. A hub and shaft securement arrangement, including;
   a. a shaft having a flat surface and flat faces contiguous thereto,
   b. a hub mounted on said shaft including an interior wall forming a flat surface and a pair of terminating end portions forming a pair of end faces, and
   c. a resilient clip means including a pair of outwardly extending portions resiliently engaging against said end faces of said hub adjacent the terminations of said flat surfaces on said hub and shaft and resiliently engaging against said flat faces on said shaft and said hub in assembled relationship.

2. A hub and shaft securement arrangement, including;
   a. a shaft having a flat surface and a flat face extending outwardly from said flat surface,
   b. said shaft including another flat face spaced from said outwardly extending flat face,
   c. a hub mounted on said shaft including an interior wall forming a flat surface,
   d. a resilient clip means resiliently engaging portions of said hub adjacent the terminations of said flat surface on said hub and resiliently engaging between said flat faces on said shaft for holding said shaft and said hub in assembled relationship,
   e. said another of said flat faces is formed by a cross groove in said shaft,
   f. said outwardly extending flat face is formed by a shoulder on said shaft, and
   g. said resilient clip means includes angularly extending portions that resiliently engage angularly extending faces on said hub.

3. The hub and shaft securement arrangement of claim 1 wherein;
   a. said resilient clip means includes a loop portion disposed outboard of one of said angularly extending portions, and
   b. said loop portion resiliently engages against said another of said faces.

* * * * *